United States Patent [19]

Hotta et al.

[11] 4,400,781
[45] Aug. 23, 1983

[54] NUMERICAL CONTROLLER FOR CAM GRINDING MACHINE

[75] Inventors: Shigeo Hotta, Nagoya; Katsumi Yamamoto, Takahama, both of Japan

[73] Assignee: Toyoda Koki Kabushiki Kaisha, Kariya, Japan

[21] Appl. No.: 228,884

[22] Filed: Jan. 27, 1981

[30] Foreign Application Priority Data

Feb. 12, 1980 [JP] Japan .................. 55-16460

[51] Int. Cl.³ ........................... B24B 51/00
[52] U.S. Cl. ...................... 364/474; 51/97 NC; 51/165.71; 318/571
[58] Field of Search .............. 364/474, 475; 51/165.71, 165.79, 165 TP, 97 NC, 105 SP, 105 EC, 101 R; 318/568, 578, 569, 571

[56] References Cited

U.S. PATENT DOCUMENTS

| | | | |
|---|---|---|---|
| 3,653,854 | 4/1972 | Asano | 51/165.7P |
| 4,005,552 | 2/1977 | Hoglund et al. | 51/101R |
| 4,027,245 | 5/1977 | Bourrat et al. | 364/474 |
| 4,031,445 | 6/1977 | Schmermund | 364/475 |
| 4,122,634 | 10/1978 | Nishimura et al. | 51/165.71 |
| 4,214,309 | 7/1980 | Koide et al. | 51/165.71 |

*Primary Examiner*—Gary Chin
*Attorney, Agent, or Firm*—Oblon, Fisher, Spivak, McClelland & Maier

[57] ABSTRACT

A numerical controller for a cam grinding machine, which has a cam drive unit and a grinding wheel drive unit, includes a memory for storing profile data of a cam corresponding to angular positions thereof. A data processor is provided for reading out the profile data from the memory so as to generate a rotational speed command indicating a rotational speed of the cam and a feed rate command indicating a feed rate of the grinding wheel at every unit angle rotation of the cam, wherein the rotational speed command and the feed rate command are so decided as to reduce the rotational speed of the cam and the feed rate of the grinding wheel while the side portions of the cam are ground. A pulse distribution circuit is connected to the data processor and responsive to the rotational speed command and the feed rate command therefrom for distributing pulses to the cam drive unit and the grinding wheel drive unit.

6 Claims, 12 Drawing Figures

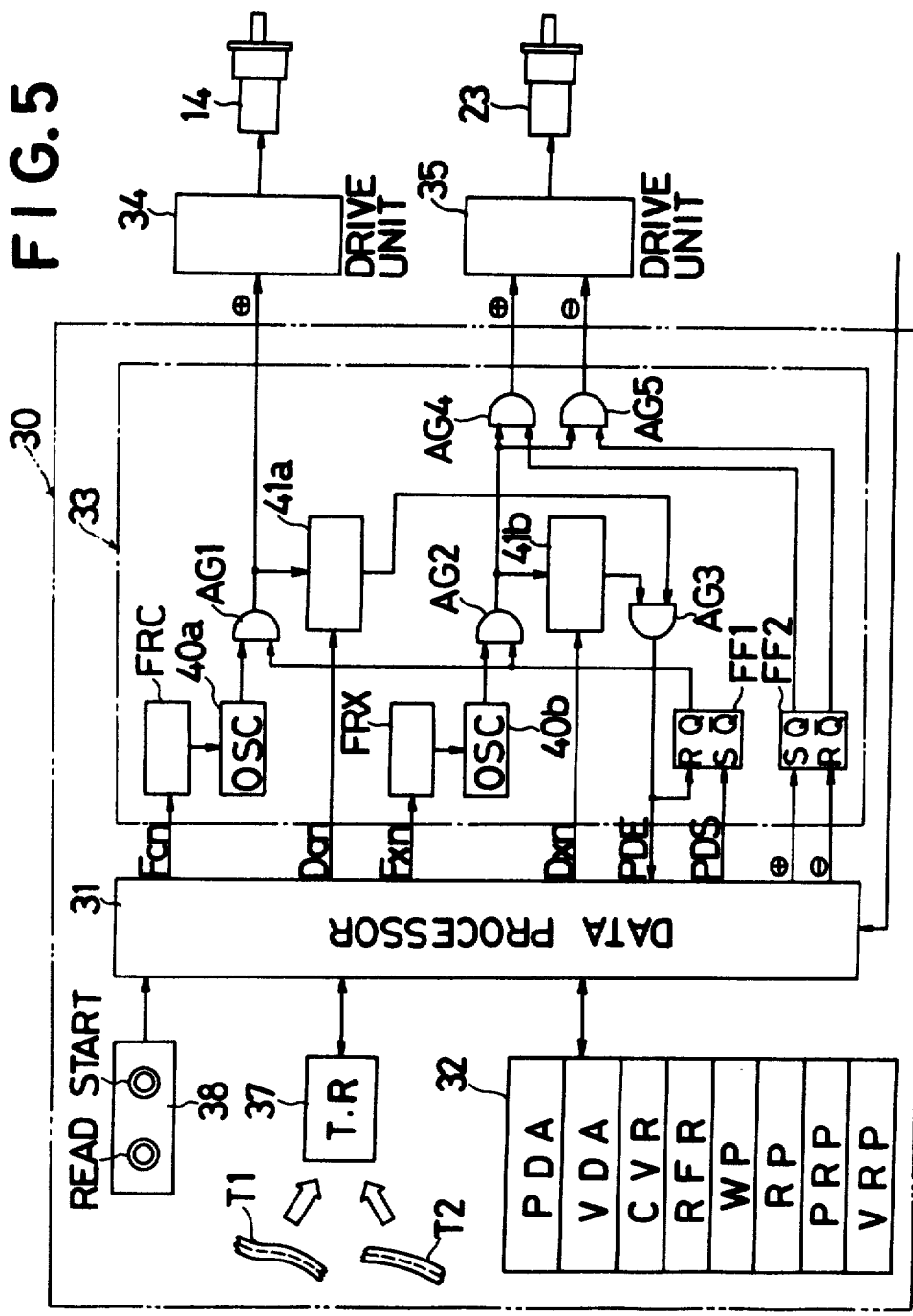

NUMERICAL CONTROLLER FOR CAM GRINDING MACHINE

BACKGROUND OF THE INVENTION

1. Field of the Invention

The present invention generally relates to a numerical controller for a cam grinding machine. More particularly, it relates to a numerical controller for controlling pulse distribution to servomotors so as to reduce both the rotational speed of the cam and the feed rate of a grinding wheel, when the side portions of a cam are ground.

2. Description of the Prior Art

A conventional numerical controller for grinding a cam portion of a workpiece is adapted to distribute pulses to a servomotor so as to maintain the rotational speed of the workpiece constant. However, the grinding of the cam portion rotating at a constant speed causes an excessive grinding or an insufficient grinding at the side portions, resulting in a profile error in the final accuracy of the cam portion.

For example, in the case of grinding a cam CM shown in FIG. 1, wherein a grinding wheel G and the cam CM are rotated in a clockwise direction as indicated by arrows therein, the grinding speed at side portions S1 and S2 rapidly changes due to the fact that a small change of the rotational angle effects a large travel of a grinding point P where the grinding wheel G contacts the cam CM, in other words, the grinding point P deviates from the line which passes through the centers O1 and O2 of the grinding wheel G and the cam CM when the side portions S1 and S2 are ground. FIG. 2 shows the relationship between the cam rotational angle $\theta$ and the travel speed VP at the grinding point P in the case of a constant cam rotational speed. It will be understood therefrom that the travel speed VP is rapidly increased at the portions between $\theta 1$ and $\theta 2$ and between $\theta 3$ and $\theta 4$ where the grinding point P is on either of the side portions S1 and S2 shown in FIG. 1. The rapid change of the grinding speed at the grinding point P creates an excessive grinding at the side portion S1 and an insufficient grinding at the side portion S2, resulting in not only uneven or local abrasion of the grinding wheel surface but also a profile error in the final accuracy of the cam CM.

For the purpose of solving these drawbacks, there have recently been suggested various methods. One of the methods is to entirely reduce the cam rotational speed, however, it requires a large expenditure of time to finish the cam CM and for that reason is impractical.

FIG. 3 shows the relationship between the position X of a grinding wheel G along the X axis indicated in FIG. 4 and the rotational angle $\theta$ of the cam CM, which relationship therebetween is derived from the profile of the cam CM. It will be understood from FIG. 3 that the value of the differentiation $dX/d\theta$ becomes large in the ranges from $\theta 1$ to $\theta 2$ and from $\theta 3$ to $\theta 4$. Further, it will be understood from FIGS. 2 and 3 that in order to reduce the rapid change of the grinding speed at the side portions S1 and S2, the rotational speed of the cam CM is required to be reduced as well as the feed rate of the grinding wheel G to obtain the final accuracy of the cam CM.

SUMMARY OF THE INVENTION

Accordingly, it is a primary object of the present invention to provide a new and improved numerical controller for a cam grinding machine, which controller is able to reduce the cam rotational speed at the side portions of a cam to thereby grind the cam with a high precision in a short period of time.

Another object of the present invention is to provide a new and improved numerical controller, which is able to reduce the cam rotational speed as well as the feed rate of a grinding wheel in accordance with a profile data stored in a memory of the numerical controller when the side portions are ground.

Briefly, according to the present invention, these and other objects are achieved by providing a numerical controller for controlling a pulse distribution to a cam drive unit for rotating a cam to be ground and to a grinding wheel drive unit for moving a grinding wheel to thereby grind a desired cam profile, as mentioned below. A memory stores profile data according to angular positions of the cam, each of which profile data represents a number of pulses which are to be distributed to the grinding wheel drive unit to follow the desired cam profile. First calculating means read out the profile data from the memory so as to generate a rotational speed command indicating a rotational speed of the cam each time the cam is rotated a predetermined rotational angle. The values of the rotational speed command decrease inversely in accordance with the increase of the number of pulses of the profile data. Second calculating means generate a feed rate command based on the rotational speed command. The feed rate command indicates a feed rate of the grinding wheel each time the cam is rotated a predetermined rotational angle, and the values of the feed rate command decrease in proportion to the decrease of the rotational speed command. Pulse distributing means are connected to the first and the second calculating means, and responsive to the rotational speed command and the feed rate command for distributing pulses to the cam drive unit and the grinding wheel drive unit.

BRIEF DESCRIPTION OF THE DRAWINGS

The foregoing and other objects and many of the attendant advantages of the present invention will be readily appreciated as the same becomes better understood by reference to the following detailed description when considered in connection with the accompanying drawings, in which:

FIG. 5 is a block diagram of the numerical controller according to the present invention;

DETAILED DESCRIPTION OF THE PREFERRED EMBODIMENT

Figure 4:
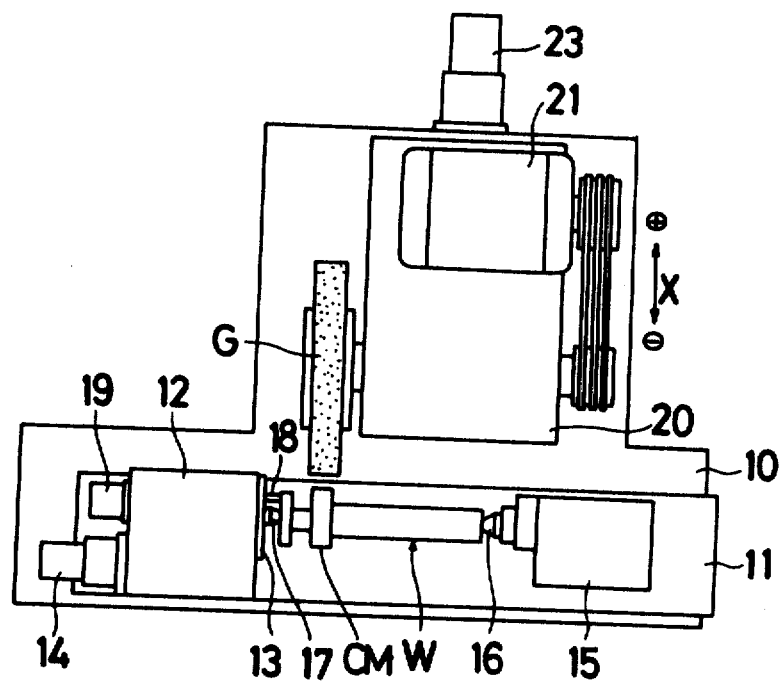
FIG. 4 is a plan view of a cam grinding machine which is controlled by a numerical controller according to the present invention.

Referring now to the drawings, wherein like reference numerals or characters refer to identical or corresponding parts throughout the several views, and more particularly to FIG. 4, a bed 10 of a cam grinding machine has mounted thereon a slide table 11, on which a headstock 12 and a foot stock 15 are mounted. A work spindle 13 is rotatably carried in the headstock 12 and rotated by a servomotor 14 mounted on the headstock 12. One end of the work spindle 13 securedly receiving a center 17 and a locating pin 18 cooperates with a center 16 of the foot stock 15 for rotatably carrying therebetween a workpiece W having a cam portion CM to be ground. A rotational angle detector 19 is mounted on the left side portion of the headstock 12 for generating a reference signal PFS when the work spindle 13 is indexed to a predetermined angular position. The bed 10 has slidably mounted thereon a wheel head 20 carrying a grinding wheel G which is rotated at a constant speed by a motor 21 mounted on the wheel head 20. A servomotor 23 is secured to the bed 10 for moving the grinding wheel G along the X axis toward and away from the workpiece W through a ball screw (not shown) in a well-known manner.

FIG. 5 is a block diagram illustrative of an electric circuit for numerically controlling the movement of the grinding machine shown in FIG. 4 by controlling the pulse distribution to the servomotors 14 and 23 in accordance with numerical commands. The electric circuit comprises a numerical controller 30 and drive units 34 and 35 for driving the servomotors 14 and 23, respectively. The numerical controller 30 includes a data processor 31 to which a memory 32 and a pulse distribution circuit 33 are connected. Further, a tape reader 37 and a manipulation panel 38 having a read switch READ and a start switch START are connected to the data processor 31. The data processor 31 and the memory 32 may be constructed by a general purpose digital computer. The memory 32 has allocated therein two data areas which are a profile data area PDA for storing profile data Xn read from a tape T1 by the tape reader 37 and a velocity data area VDA for storing velocity data calculated from the profile data Xn, two registers which are a register CVR for storing a total grinding feed amount and a decimal register RFR for storing a decimal number, and four pointers which are a write-in pointer WP, a read-out pointer RP, a profile data read-out pointer PRP and a velocity data read-out pointer VRP, referred to later.

The following TABLE 1 shows an example of the profile data Xn punched on the tape T1.

TABLE 1

| Profile Data Xn | Meaning |
| --- | --- |
| 1 | Advance 1 pulse |
| 1 | Advance 1 pulse |
| 2 | Advance 2 pulses |
| 4 | Advance 4 pulses |
| . | . |
| . | . |
| . | . |
| −3 | Retract 3 pulses |
| −2 | Retract 2 pulses |
| −1 | Retract 1 pulse |
| 0 | None |

TABLE 1-continued

| Profile Data Xn | Meaning |
| --- | --- |
| EOB | End of Tape T1 |

Figure 1:
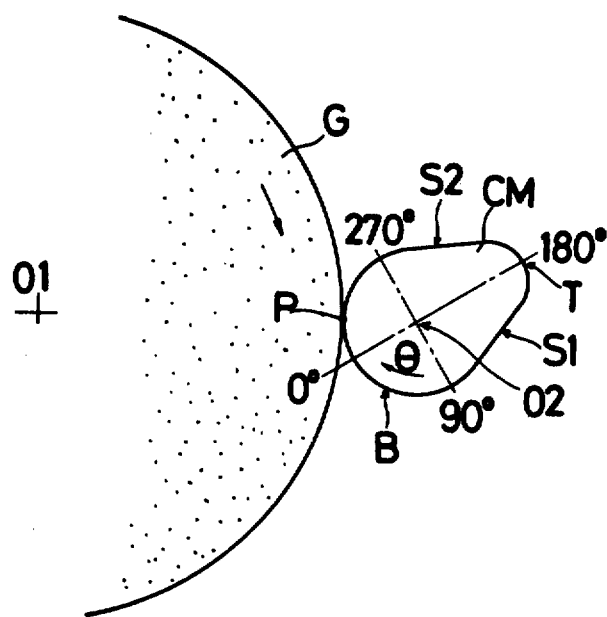
FIG. 1 is a schematic illustration of a grinding operation for explaining a variation in the grinding speed at the grinding point P shown in FIG. 1.
Figure 2:
FIG. 2 is a graph illustrating the relationship between a cam rotational angle and a travel speed at the grinding point P shown in FIG. 1 in the case of a constant cam rotational speed.
Figure 3:
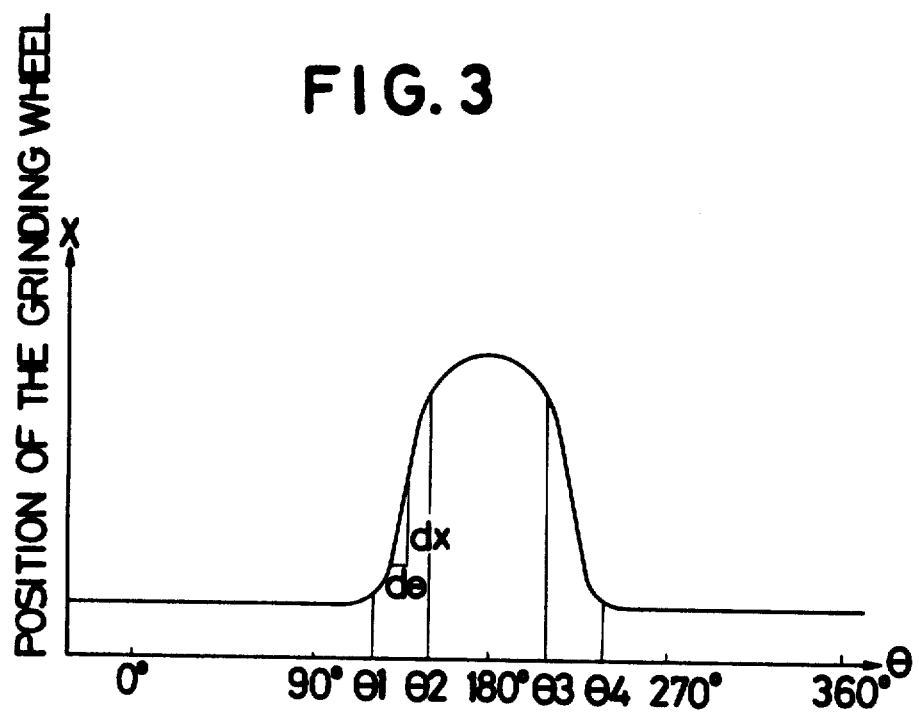
FIG. 3 is a graph illustrating the relationship between the cam rotational angle and the position of a grinding wheel.

Each of the profile data Xn is written by use of the number of pulses to be distributed to move the grinding wheel G to follow a desired cam profile each time the cam is rotated a predetermined angle (hereafter referred to a unit angle). For example, "1" in the first line of TABLE 1 means that the grinding wheel G is to be moved a predetermined length corresponding to one pulse toward the workpiece W when the workpiece W is at a first unit angle position, and "2" in the third line means that the grinding wheel G is to be moved twice as much as the predetermined length toward the workpiece W when the workpiece W is at a third unit angle position. It will be understood that the numeral included in the profile data Xn is larger at the side portions S1 and S2 than at a base circle portion B and a top portion T shown in FIG. 1.

TABLE 2 shows an example of sequence data punched on a tape T2.

TABLE 2

| Sequence Data | Meaning |
| --- | --- |
| No. 01 G00X-40000CR | Indexing of the cam CM and the work spindle, and rapid advance of the grinding wheel G: 40,000 pulses |
| No. 02 S60X-20000F1000CR | Rotational speed of the work spindle: 60 rpm<br>Total grinding feed amount: 20,000 pulses<br>Feed rate per one revolution of the work spindle: 1,000 pulses |
| No. 03 S30X-2000F200CR | Rotational speed of the work spindle: 30 rpm<br>Total grinding feed amount: 2,000 pulses<br>Feed rate per one revolution of the work spindle: 200 pulses |
| No. 04 S20X-100F50CR | Rotational speed of the work spindle: 20 rpm<br>Total grinding feed amount: 100 pulses<br>Feed rate per one revolution of the work spindle: 50 pulses |
| . | |
| . | |
| . | |
| No. n M02 | End of the sequence data |

The sequence data are composed of a plurality of blocks. Each block, except several blocks including the first and the last blocks, is formed of S code for indicating a rotational speed of the work spindle 13 and the workpiece W, X code for indicating a total grinding feed amount and F code for indicating the feed rate of the grinding wheel G. The block No. 2 S60X-20000F1000CR is for a rough grinding operation and the following blocks are for fine grinding operations. The first block is composed of G code which instructs the indexing of the workpiece W and the rapid feed of the grinding wheel G. The last block is composed of M code which means the end of the sequence data.

The pulse distribution circuit 33 is connected between the data processor 31 and the drive units 34 and 35 for the servomotors 14 and 23 for controlling the pulse distribution to the drive units 34 and 35. The pulse distribution circuit 33 is provided with a rotational speed register FRC to which a pulse generator 40a is connected for generating pulses at a frequency corresponding to rotational speed command Fcn set in the register FRC. An AND gate AG1 is connected to the pulse generator 40a to receive pulses therefrom so as to output pulses to the drive unit 34 and a preset counter 41a, when receiving a set signal thereto from the set output terminal Q of a flip-flop FF1. Similarly, a feed rate register FRX and a pulse generator 40b are provided for generating pulses at a frequency corresponding to feed rate command Fxn set in the register FRX, and an AND gate AG2 is connected to the pulse generator 40b so as to output pulses to the drive unit 35 through an AND gate AG4 or AG5 and to a preset counter 41b, when receiving the set signal thereto from the flip-flop FF1. The preset counters 41a and 41b are preset with amounts Dcn and Dxn respectively, described later. The content of each of the preset counters 41a and 41b is subtracted one by one each time a pulse is applied thereto. The function of the preset counters 41a and 41b is to output a signal to an AND gate AG3 when the content thereof becomes zero by the subtraction. When both of the preset counters 41a and 41b output the signals, the AND gate AG3 outputs a completion signal PDE to the data processor 31 and to the reset input terminal R of the flip-flop FF1 so as to reset the same to thereby stop pulse distribution to the drive units 34 and 35. A flip-flop FF2 is further provided in the pulse distribution circuit 33 for alternatively setting one of the AND gates AG4 and AG5 so as to determine the direction of the movement of the wheel head 20 carrying the grinding wheel G. Accordingly, when the flip-flop FF1 is set by a pulse distribution signal PDS from the data processor 31, the cam CM is rotated by the servomotor 14 an amount corresponding to the amount Dcn at a rotational speed corresponding to the rotational speed command Fcn. Further, the grinding wheel G is moved by the servomotor 23 an amount corresponding to the amount Dxn at a feed rate corresponding to the feed rate command Fxn.

Figure 6A:
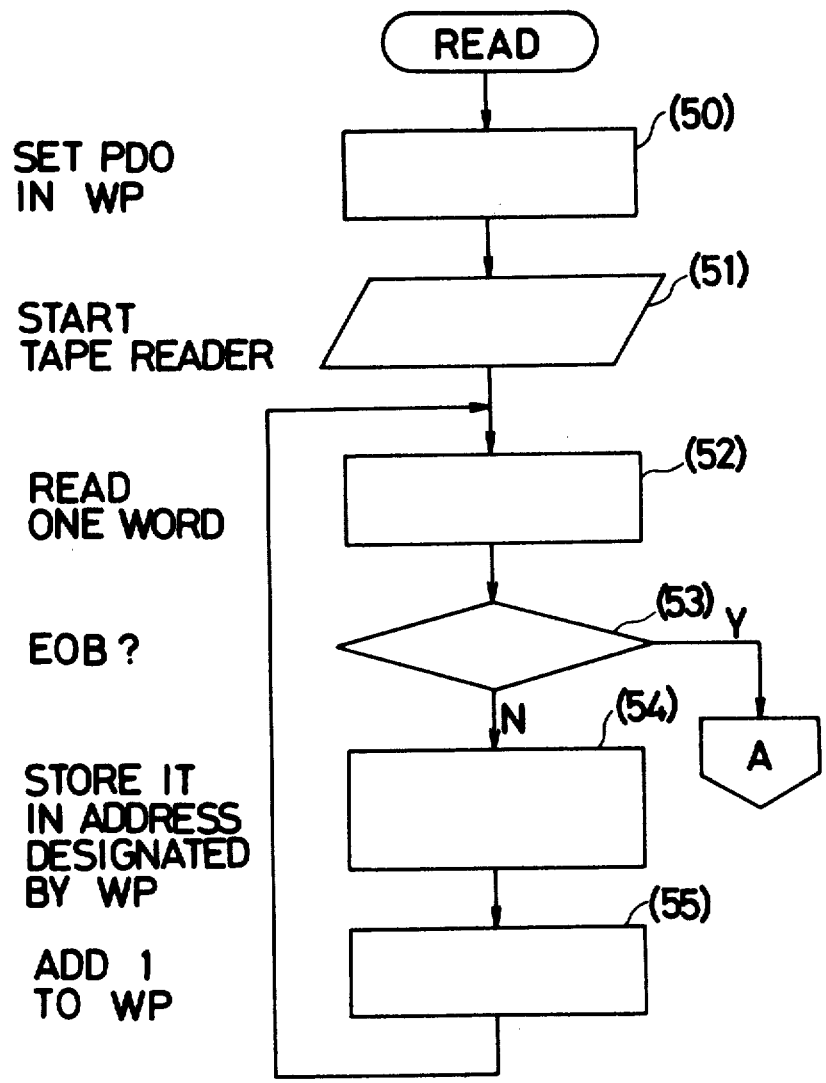
FIGS. 6(a) and 6(b) are flow charts for explaining the operation that a data processor shown in FIG. 5 executes for storing profile data in a memory and for calculating velocity data.
Figure 6B:
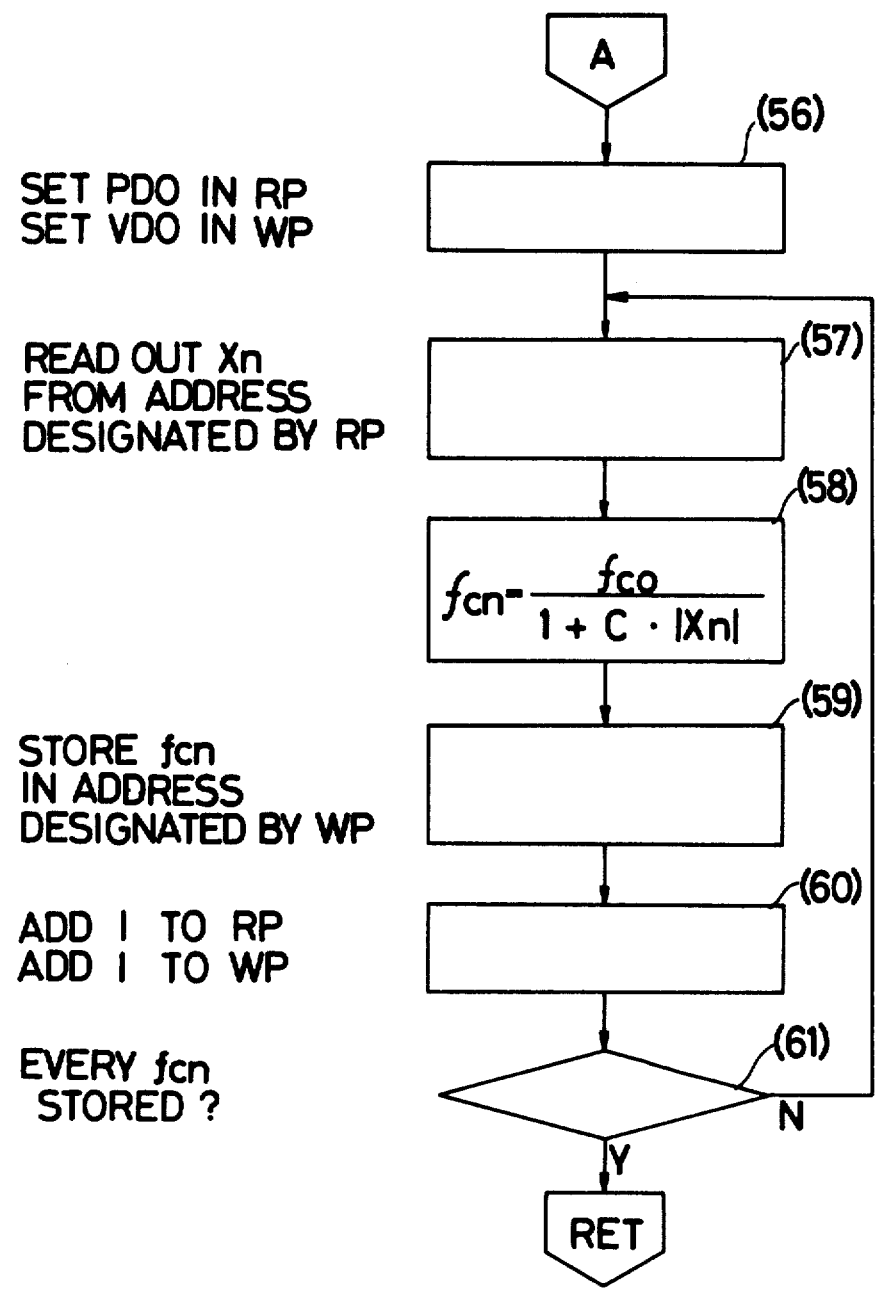

Description is now made of the execution of the data processor 31 for determining the values of the commands Fcn, Dcn, Fxn and Dxn and for numerical controlling the grinding machine so as to reduce the rotational speed of the cam CM and the feed rate of the grinding wheel G when the side portions S1 and S2 of the cam CM are ground. When the read-out switch READ is depressed after the tape T1 is set on the tape reader 37, the data processor 31 executes steps 50-61 of a read routine READ shown in FIGS. 6(a) and 6(b) for reading profile data from the tape T1 and for calculating velocity data fcn from the profile data Xn. Subsequently, when the start switch START is depressed after the tape T2 is set on the tape reader 37, the data processor 31 executes steps 70-107 shown in FIGS. 7(a) to 7(e) for determining the values of the commands Fcn, Dcn, Fxn and Dxn and for numerically controlling the movement of the grinding wheel G and the rotational movement of the workpiece W so as to obtain a final accuracy of the cam CM.

More particularly, the data processor 31 sets in step 50 into the write-in pointer WP of the memory 32 a number corresponding to a first address PDO in the profile data area PDA and instructs in steps 51 and 52 the tape reader 37 to read one word of the profile data Xn from the tape T1. In step 53, if it is ascertained that the word read by the tape reader 37 involves EOB which means the end of tape, the step is advanced to step 56, however, if not, the step is advanced to step 54. In step 54, the data processor 31 stores the word in the address PDO of the profile data area PDA designated by the write-in pointer WP and, in step 55, the data processor 31 adds 1 to the write-in pointer WP so as to designate the next address. Then the processing of the data processor 31 is returned to step 52 for reading the next word so as to store in step 54 the same in the next address designated by the write-in pointer WP. In this way, the steps 52-55 are repeated until the whole profile data Xn, for example, such as shown in TABLE 1, are stored in the profile data area PDA in order.

Subsequently, if it is ascertained in step 53 that the tape t1 has come to the end, step 56 is reached to set into a read-out pointer RP the number corresponding to the first address PDO of the profile data PDA and to set into the write-in pointer WP a number corresponding to a first address VDO of the velocity data area VDA. Subsequently, the data processor 31 executes step 57 for reading out one of the profile data Xn from an address of the profile data area PDA designated by the read-out pointer RP. Next step 58 involves obtaining velocity data fcn through the following equation:

$$fcn = \frac{fco}{1 + C \cdot |Xn|}.$$

where fco is a frequency at which pulses are required to be distributed to rotate the work spindle 13 one revolution in one second, and C is a constant which is determined experimentally. For example, assuming that one pulse rotates the work spindle 13 and the cam CM one-thousandth degree, the frequency fco will be 360,000 c/sec. The constant C may be a relatively small number such as 2. In the case that the data Xn is 1, the velocity data fcn is obtained as follows:

$$fcn = \frac{360,000}{1 + (2 \times 1)} = 120,000$$

In step 59, the data processor 31 stores the velocity data fcn in an address designated by the pointer WP. In step 60, the data processor 31 adds 1 both to the read-out pointer RP and the write-in pointer WP so as to designate the next addresses, and in step 61 is is ascertained as to whether every profile data Xn are read out from the profile data area PDA and whether every velocity data fcn are stored in the velocity data area VDA. The execution of steps 57-61 is repeated until its ascertainment. It will be noted that velocity data fcn have smaller values at the side portions S1 and S2 than at the base circle portion B and the top portion T, since the absolute value of the profile data Xn stored in the profile data area PDA is larger at the side portions S1 and S2 than at the base circle portion B and the top portion T.

Figure 7A:
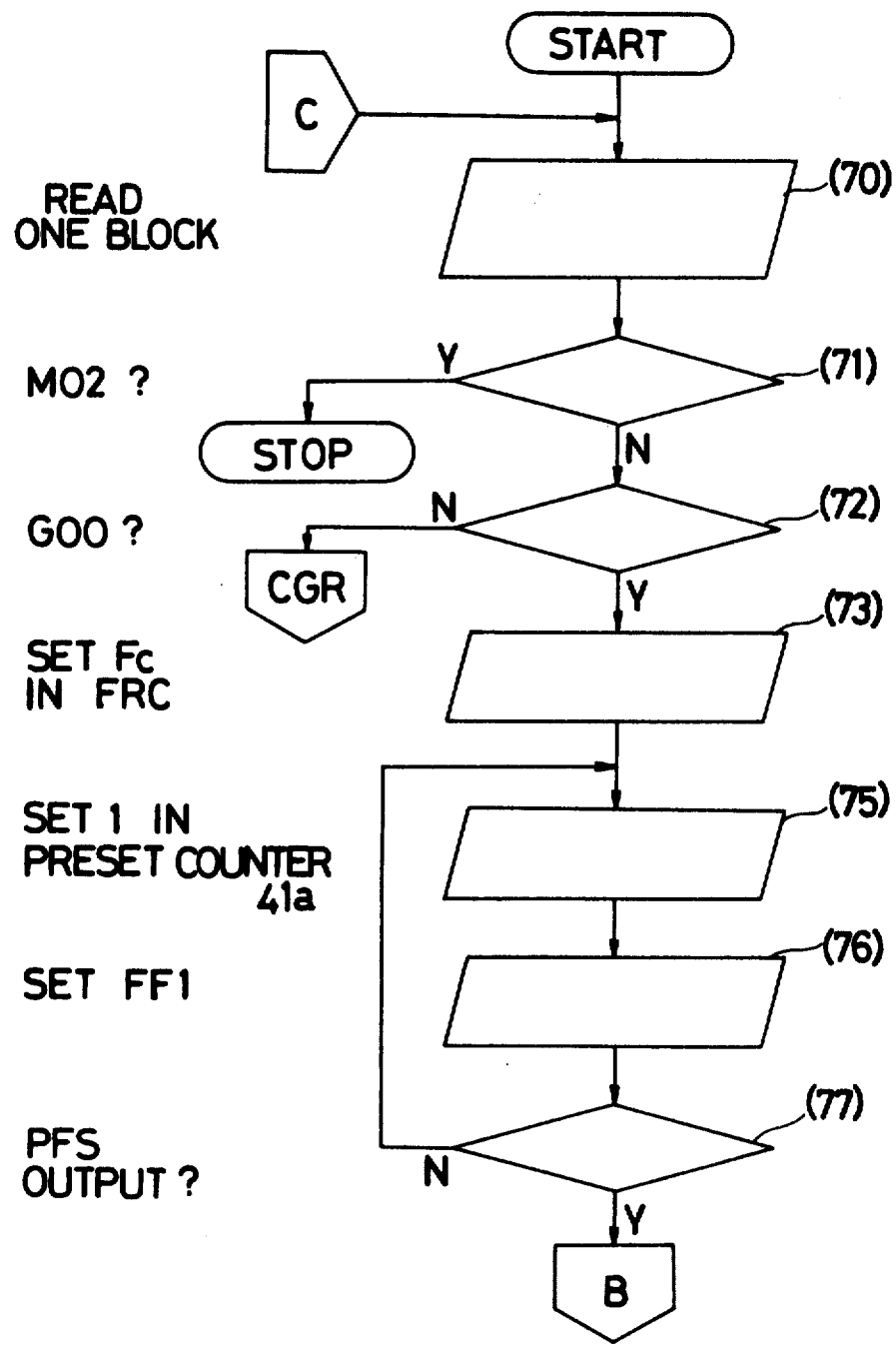
FIGS. 7(a) to 7(e) are also flow charts for explaining the operation that the data processor executes for numerically controlling the movement of the cam grinding machine.
Figure 7B:
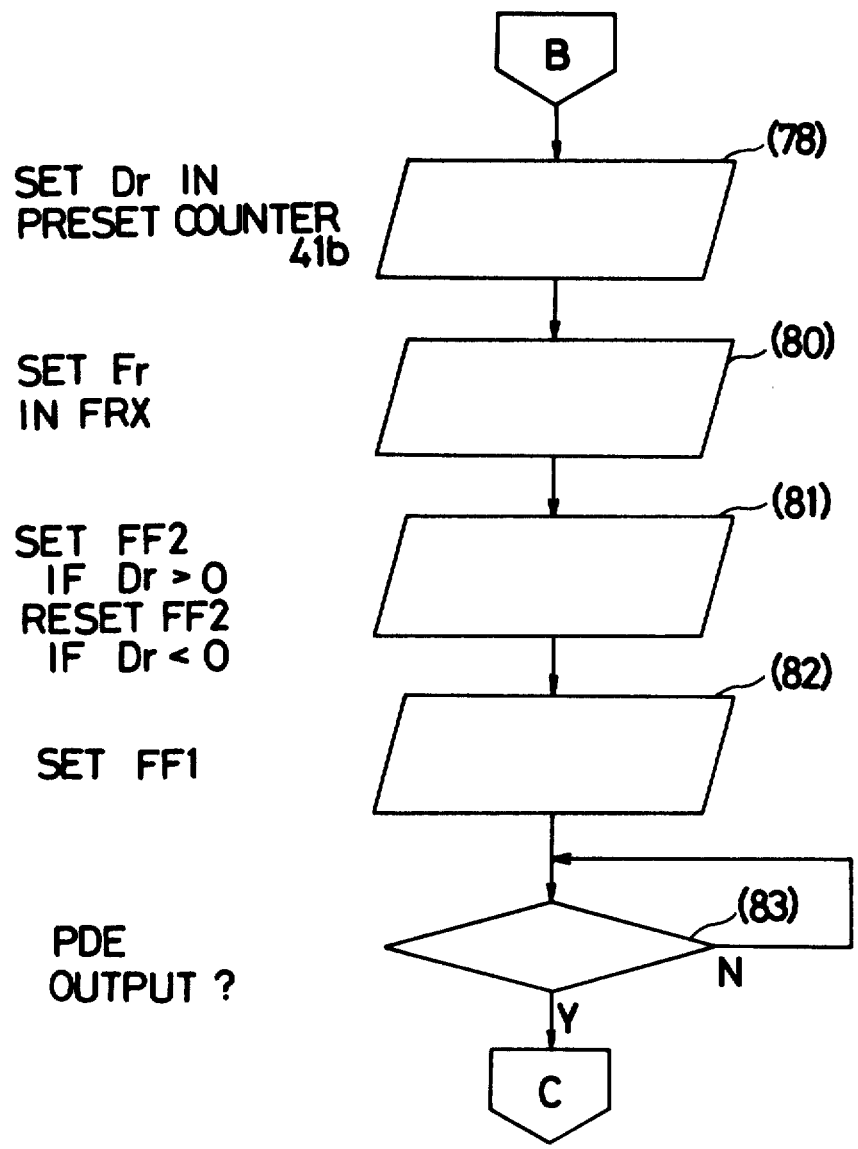
Figure 7C:
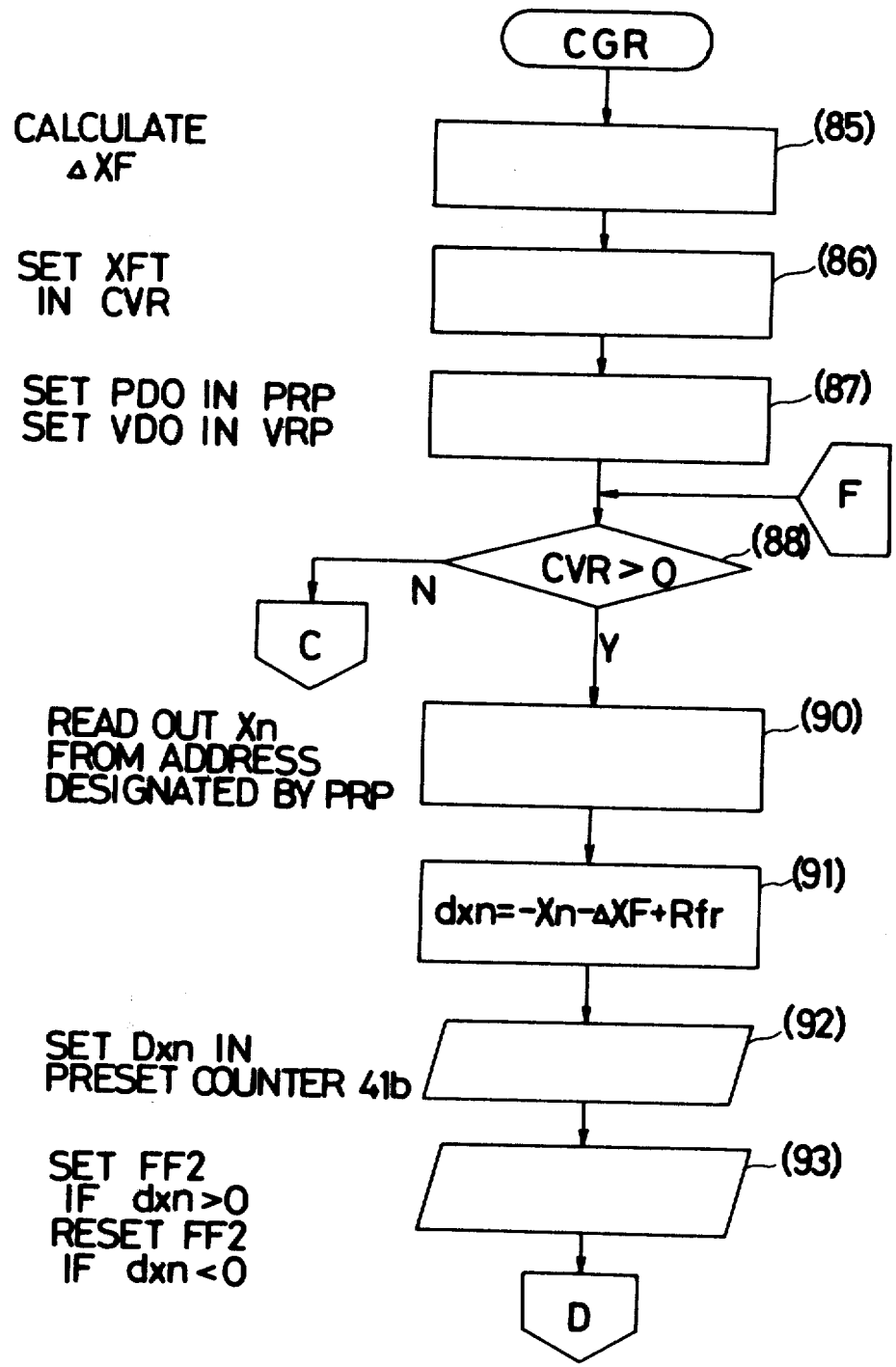
Figure 7D:
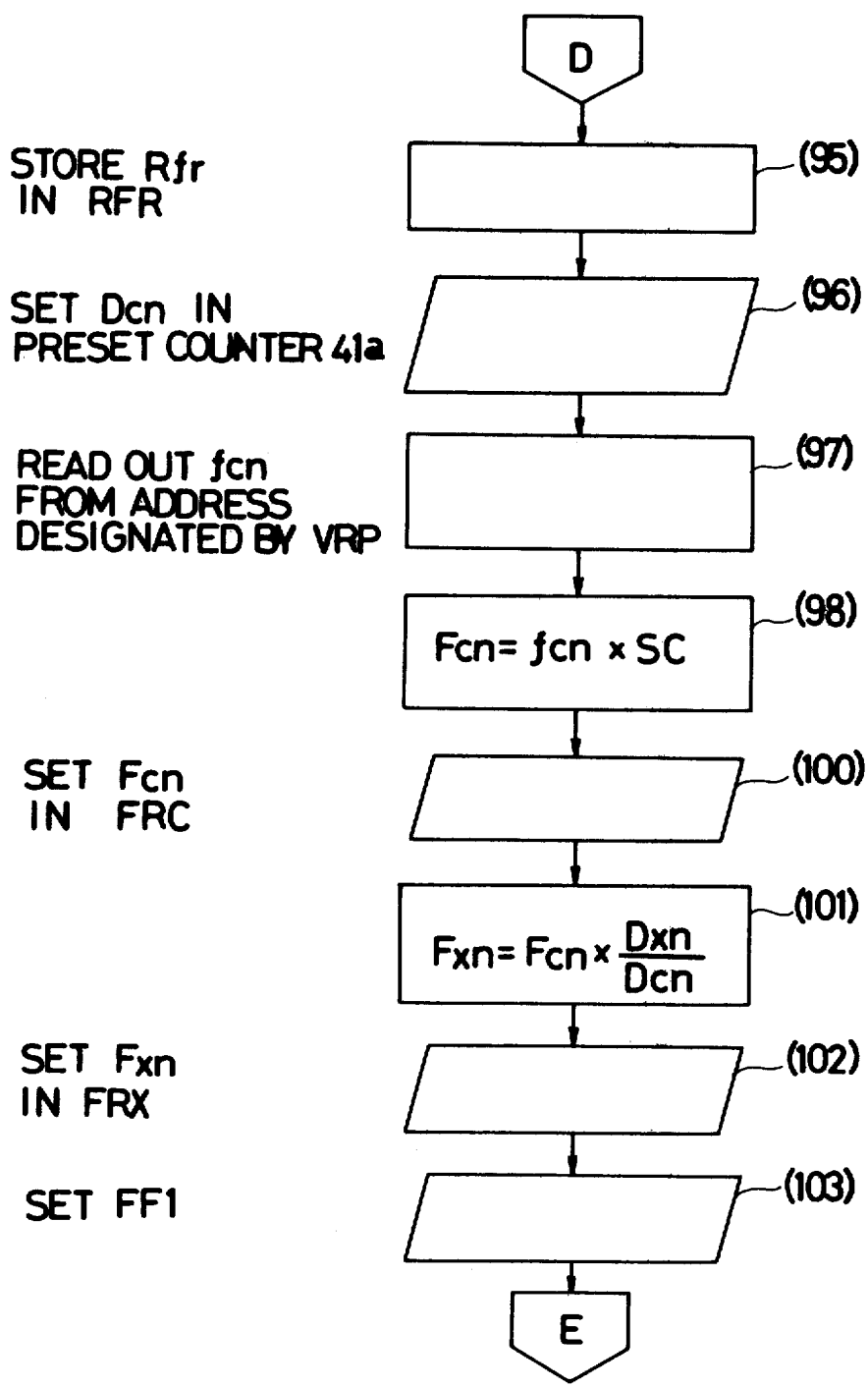
Figure 7E:
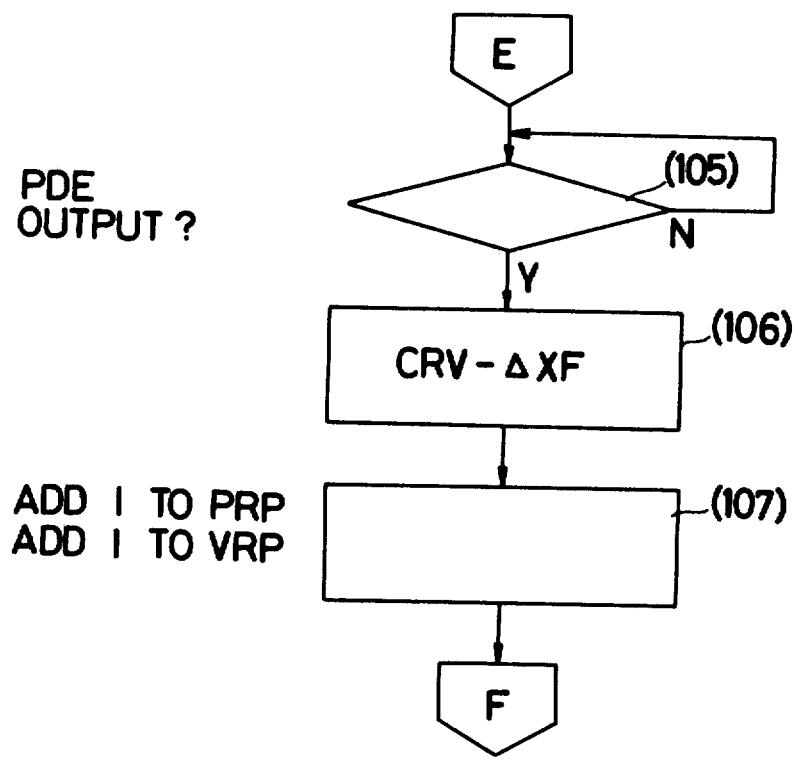

Subsequently, when the start switch START is depressed after the tape T2 is set on the tape reader 37, the data processor 31 executes steps 70-83 of a routine START shown in FIGS. 7(a) and 7(b) for indexing of the cam CM and rapid feed of the grinding wheel G, and steps 85-107 of a routine CGR shown in FIGS. 7(c) to 7(e) for reducing the rotational speed of the work spindle 13 and the cam CM, and the feed rate of the grinding wheel G when side portions S1 and S2 are ground in order to obtain a final accuracy of the cam CM.

More specifically, in step 70, the data processor 31 reads one block of the sequence data punched on the tape T2 and checks in steps 71 and 72 as to whether the block involves the code M02 or the code G00. If there is the code M02, the processing of the data processor 31 stops, but if there is not the code M02 nor the code G00, the processing of the data processor 31 is advanced to step 85 from step 72. If there is the code G00, step 73 is reached so as to set into the rotational speed register FRC of the pulse distribution circuit 33 a predetermined rotational speed Fc which is suitable for indexing the cam CM to a predetermined angular position, and then, in step 75, the data processor 31 sets the number 1 into the preset counter 41a. Accordingly, when the flip-flop FF1 is set in step 76, one pulse is distributed to the servomotor 14 through the drive unit 34 and then, in step 77, it is ascertained whether the reference signal PFS indicating the completion of indexing is output from the rotational angle detector 19. The steps 75-77 are repeated until the signal PFS is output. It will be understood that pulses are distributed one by one at a frequency corresponding to the predetermined speed Fc set in the rotational speed register FRC so as to complete the indexing of the cam CM at the suitable rotational speed Fc.

After indexing the cam CM, the data processor 31, in step 78, sets into the preset counter 41b a total feed amount Dr indicated by X code in the block of the sequence data read by the tape reader 37 and then in step 80 sets into the feed rate register FRX a rapid feed rate command Fr. Depending upon the mark of the feed amount Dr, positive or negative, the flip-flop FF2 is in step 81 alternatively caused to be set or reset, so that the grinding wheel G is rapidly moved away from or toward the cam CM, when the flip-flop FF1 is set in the following step 82 to permit the AND gate AG2 to output pulses to the servomotor 23 through the drive unit 35. Pulse distribution continues until the completion signal PDE is output from the AND gate AG3 in step 83. Accordingly, the grinding wheel G is moved rapidly the feed amount Dr set in the preset counter 41b at the rapid feed rate corresponding to the rapid feed rate command Fr set in the register FRX.

By way of example, assuming a sequence data is consisted of the data shown in TABLE 2, the first block G00X-40000CR is read in step 70 and since this block includes the code G00, the data processor 31 executes steps 73-83. In step 73, the predetermined rotational speed Fc suitable for indexing, such as the value corresponding to 30 rpm, is set in the rotational speed register FRC. After indexing the cam CM by executing steps 75-77, the absolute feed amount 40000 indicated by X code is set in the preset counter 41b in step 78. Then the value corresponding to a predetermined rapid feed rate command Fr, such as 2 m/min, is preset in the feed rate register FRX in step 80. Since the block has a negative feed amount $-40000$, the flip-flop FF2 is reset in step 81 and, on setting the flip-flop FF1 in step 82, pulses are distributed to the drive unit 35 through the AND gates AG2 and AG5 until the signal PDE is output from the AND gate AG3 in step 83.

After indexing of the cam CM and rapid advance of the grinding wheel G, the data processor 31 executes steps 85-107 for numerically controlling the grinding of the cam CM, and more particularly for reducing the rotational speed of the cam CM and the feed rate of the grinding wheel G when the side portions S1 and S2 are ground.

If a block of the sequence data read in step 70 has not the code M02 nor the code G00, the processing of the data processor 31 is advanced to step 85 from step 72. The data processor 31 executes step 85 for calculating a feed amount per one unit angle $\Delta XF$ from the feed amount per one revolution indicated by F code by equally dividing the same. For example, when the second block S60X-20000F1000CR is read in step 70, the feed amount per one unit angle $\Delta XF$ is calculated, assuming that one unit angle is 0.25 degree, as follows:

$$\Delta XF = 1000 \times \frac{0.25}{360} = 0.694$$

In step 86, the total feed amount XFT indicated by X code is stored in the register CVR of the memory 32, for example, the absolute amount 20000 in the second block is stored in the register CVR. In step 87, the data processor 31 sets the first address PDO of the profile data area PDA into the read-out pointer PRP, and the first address VDO of the velocity data area VDA into the read-out pointer VRP. The data processor 31 executes step 88 to check as to whether the content of the register CVR is zero or more than zero to thereby determine whether the grinding wheel G is moved the amount set in the register CVR or not, and if the content thereof is zero, the step is returned to step 70 for reading the next block of the sequence data, however, if it is more than zero, the step is advanced to step 90-107.

The following steps 90-92 are executed in order to determine an actual feed amount Dxn of the grinding wheel G at every unit angle rotation of the cam CM and to set the same in the preset counter 41b. More particularly, the data processor 31 operates in step 90 to read out one of the profile data Xn from an address of the profile data area PDA designated by the read-out pointer PRP, and in step 91 a feed amount dxn is obtained through the following equation:

$$dxn = -Xn - \Delta XF + Rfr.$$

where Xn is a profile data which is written by use of the number of pulses to be distributed to move the grinding wheel G at every unit angle rotation of the cam, such as shown in TABLE 1, $\Delta XF$ is a feed amount per one unit angle calculated in step 85 and Rfr is a decimal number stored in the decimal register RFR of the memory 32, referred to later. Then the data processor 31 sets to step 92 into the preset counter 41b an actual feed amount Dxn which is the absolute integral number portion of the feed amount dxn. The flip-flop FF2 is alternatively set or reset in step 93, depending on the feed amount dxn being positive or negative, so as to determine the direction of the movement of the grinding wheel G. The decimal number portion Rfr or the rest portion of the feed amount dxn is stored in step 95 in the decimal register RFR for use in step 91 next time. For example, in the case that Xn=1, $\Delta XF$=0.694 and Rfr=0, the amount dxn will be $-1.694$ so that the amount Dxn, 1, is set in the preset counter 41b in step 92 and the flip-flop FF2 is reset in step 93. Further the decimal number $-0.694$ is set in the register RFR in step 95. The data processor 31 executes next step 96 so as to set nto the preset counter 41a a predetermined pulse number Dcn which is required to rotate the cam CM one unit angle. For example, assuming that one unit angle is 0.25 degree and one pulse rotates the cam CM 0.001 degree, the number Dcn will be 250.

The following steps 97–102 are executed for determining a rotational speed command Fcn for rotating the cam CM at a desired rotational speed and a feed rate command Fxn for moving the grinding wheel G at a desired feed rate. More particularly, in step 97 one of the velocity data fcn is read out from an address of the velocity data area VDA designated by the read-out pointer VRP and then a rotational speed command Fcn is obtained is step 98 through the following equation:

$$Fcn = fcn \times SC,$$

where SC is a rotational speed of the work spindle 13 indicated by S code in a block of the sequence data. For example, in the case of the second block S60X-20000F1000CR, the rotational speed SC is 1 rps (60 rpm). After the rotational speed command Fcn is set in the rotational speed register FRC in step 100, a feed rate command Fxn is calculated in step 101 as follows:

$$Fxn = Fcn \times (Dxn/Dcn),$$

so that pulses to be distributed to both of the drive units 34 and 35 are synchronously adjusted at every unit angle rotation. For example, assuming than fcn=120,000, SC=1, Dxn=1, and Dcn=250, as aforementioned, the rotational speed command Fcn will be 120,000 and the feed rate command Fxn will be 480.

The feed rate command Fxn is set in the feed rate register FRX in step 102. As a result, when the flip-flop FF1 is set in step 103, pulses are distributed to the drive units 34 and 35 in accordance with the feed amount Dxn, the rotational amount Dcn, the rotational speed command Fcn and the feed rate command Fxn, until the completion signal PDE is output is step 105 from the AND gate AG3. The data processor 31 operates in step 106 to subtract the feed amount per one unit angle ΔXF from the content of the register CVR and in step 107 to add 1 to each of the read-out pointers PRP and VRP so as to designate the next addresses.

The steps 88–107 are repeatedly executed until the content of the register CVR is ascertained to be zero in step 88. After its ascertainment, the processing of the data processor 31 is returned to step 70 for reading next one block of the sequence data. For example, after carrying out the second block S60X-20000F1000CR, the next blocks, which are fork fine grinding operations, are carried out. Aforementioned routines START and CGR are repeatedly executed until it is ascertained in step 71 that the block read out in step 70 involves the code M02.

It will be understood that the value of the rotational speed Fcn becomes smaller at side portions S1 and S2 than at the base portion B and the top portion T since the value of the velocity data fcn is smaller at side portions S1 and S2 due to the fact that the absolute value of the profile data Xn becomes larger at side portions S1 and S2 while the values of fco and C are constant.

Further it will be understood that the value of the feed rate command Fxn is reduced at side portions S1 and S2, since the value of the rotational speed Fcn decreases at side portions S1 and S2. Accordingly, both of the rotational speed of the cam CM and the feed rate of the grinding wheel G are reduced at the side portions S1 and S2 where the absolute value of the differentiation $dX/d\theta$ changes rapidly. Therefore, the rapid change of the grinding speed at side portions S1 and S2 can be prevented to that the cam CM can be ground with a high precision in a short period of time.

In the above-described particular embodiment, the rotational speed command Fcn is calculated in step 98, after calculation of the velocity data fcn in step 58, through the equation:

$$Fcn = fcn \times SC,$$

however, the rotational speed command Fcn may be calculated, after reading the sequence data, in one step as follows:

$$Fcn = (fco \cdot SC)/(1 + C \cdot |Xn|).$$

Furthermore, in the above-described particular embodiment, the pulse distribution rate to the servomotors 14 and 23 is altered by changing the rotational speed command Fcn and the feed rate command Fxn at every unit angle rotation of the cam, however, it may be altered each time the cam CM is rotated a certain angle which is several times as much as a unit angle.

Obviously, numerous modifications and variations of the present invention are possible in light of the above teachings. It is therefore to be understood that within the scope of the appended claims, the invention may be practiced otherwise than as specifically described herein.

What is claimed is:

1. A numerical controller for controlling pulse distribution to a cam drive unit for rotating a cam to be ground and to a grinding wheel drive unit for moving a grinding wheel to thereby grind said cam to a desired cam profile, comprising:

memory means for storing a plurality of profile data respectively corresponding to a plurality of angular ranges through which said cam is rotated, each of said profile data representing the number of pulses which are to be distributed to said grinding wheel drive unit when said cam is rotated through one of said angular ranges corresponding to said each of said profile data;

feed rate calculation means for calculating, respectively based upon said plurality of said profile data stored in said memory means, a plurality of first distribution speeds which respectfully correspond to said plurality of said angular ranges and at each of which pulses are to be distributed to one of said cam drive units and said grinding wheel drive unit when said cam is rotated through a corresponding one of said angular ranges, each of said first distribution speeds being inversely proportional to the number of pulses which is represented by a corresponding one of said profile data; and pulse distribution means responsive to said plurality of said first distribution speeds calculated by said feed rate calculation means for distributing pulses to said one of said cam drive units and said grinding wheel drive unit at one of said first distribution speeds and to the other of said cam drive unit and said grinding wheel drive unit at a second distribution speed relating to said one of said first distribution speeds when said cam is rotated through one of said angular ranges corresponding to said one of said first distribution speeds.

2. A numerical controller as set forth in claim 1, further comprising:

data output means for selectively outputting said plurality of said first distribution speeds to said pulse distribution means each time said cam is rotated through one of said angular ranges; and another feed rate calculation means operable each time one of said first distribution speeds is output by said data output means to said pulse distribution means for calculating said second distribution speed based upon said one of said first distribution speeds, one of said profile data corresponding to said one of said first distribution speeds and numerical data indicative of the number of pulses which are to be distributed to said cam drive unit each time said cam is rotated through one of said angular ranges.

3. A numerical controller for controlling pulse distribution to a cam drive unit for rotating a cam to be ground and to a grinding wheel drive unit for moving a grinding wheel to thereby grind said cam to a desired cam profile, comprising:

first memory means for storing a plurality of profile data respectively corresponding to a plurality of angular ranges through which said cam is rotated, each of said profile data representing the number of pulses which are to be distributed to said grinding wheel drive unit when said cam is rotated through one of said angular ranges corresponding to said each of said profile data;

first feed rate calculation means for calculating, respectively based upon said plurality of said profile data stored in said first memory means, a plurality of first distribution speeds which respectively correspond to said plurality of said angular ranges and at each of which pulses are to be distributed to one of said cam unit and said grinding wheel drive unit when said cam is rotated through a corresponding one of said angular ranges, each of said first distribution speeds being inversely proportional to the number of pulses which is represented by a corresponding one of said profile data;

second memory means for storing a plurality of data respectively indicative of said plurality of said first distribution speeds calculated by said first feed rate calculation means;

data output means operable each time said cam is rotated through one of said angular ranges for outputting one of said profile data and one of said first distribution speed data corresponding to a successive one of said angular ranges respectively from said first and second memory means and for further outputting numerical data indicative of the number of pulses which are to be distributed to said cam drive unit when said cam is rotated through said successive one of said angular ranges;

second feed rate calculation means for calculating, based upon said one of said profile data, said one of said first distribution speed data and said numerical data output by said data output means, a second distribution speed at which pulses are to be distributed to the other of said cam drive unit and said grinding wheel drive unit when said cam is rotated through said successive one of said angular ranges; and pulse distribution means responsive to said one of said first distribution speed data output from said second calculation means for distributing pulses to said one of said cam drive unit and said grinding wheel drive unit at said second distribution speed.

4. A numerical controller as set forth in claim 3, wherein:

each of said plurality of said angular ranges has the same angular range as one another; and the number of pulses indicated by said numerical data is predetermined.

5. A numerical controller as set forth in claim 3, wherein:

said pulse distribution means is also responsive to said one of said profile data and said numerical data output by said data output means for distributing pulses of a number designated by said one of said profile data to said grinding wheel drive unit and for simultaneously distributing pulses of a number designated by said numerical data to said cam drive unit.

6. A numerical controller as set forth in claim 5, wherein said pulse distribution means includes:

first and second pulse generation means respectively responsive to said one of first distribution speed data output by said data output means and said second distribution speed data output from said second feed rate calculation means for distributing pulses to said cam drive unit at said one of said first distribution speeds and for simultaneously distributing pulses to said grinding wheel drive unit at said second distribution speed; and first and second control means respectively responsive to said one of said profile data and said numerical data output by said data output means for limiting the number of pulses distributed from said first pulse generation means to said cam drive unit to the number represented by said numerical data and for limiting the number of pulses distributed from said second pulse generation means to said grinding wheel drive unit to the number represented by said one of said profile data.

* * * * *